United States Patent Office 2,948,658
Patented Aug. 9, 1960

2,948,658
PROCESS FOR PRODUCING DIHYDROXY ACETONE

Samuel R. Green, Westfield, N.J., assignor to Baxter Laboratories, Inc.

No Drawing. Filed Feb. 25, 1960, Ser. No. 10,888

11 Claims. (Cl. 195—43)

This invention relates to an improved method for the production of dihydroxyacetone by microbial fermention. More particularly, this invention relates to the use of members of the genus Acetobacter for the commercially practicable microbial conversion of glycerol to dihydroxyacetone.

Dihydroxyacetone, $CH_2OH—CO—CH_2OH$, is a material which, because of the presence of two highly reactive spaced-apart hydroxyl groups, is valuable as a chemical intermediary for the synthesis of a number of organic chemicals. Dihydroxyacetone has been used as a catalyst in butadiene-styrene polymerization recipes and is an effective catalyst for the condensation of formaldehyde to hydroxyaldehydes and hydroxyketones. Also, by esterifying the hydroxyl groups of dihydroxyacetone with fatty acids such as palmitic acid, surface active substances are formed. These surface active substances have emulsifying properties which render them useful in the food and detergent industries.

The microbial conversion of glycerol to dihydroxyacetone is well known. A number of literature references suggest the use of Acetobacter suboxydans to achieve this microbial conversion. However, none of the methods, processes, and techniques described in the literature could be employed for the commercially practicable production of dihydroxyacetone. In order to be commercially practicable, a fermentation process for the conversion of glycerol to dihydroxyacetone must satisfy certain criteria. It must be possible to incorporate into the fermentation medium a relatively high percentage by weight of glycerol. For cost considerations, the conversion of glycerol to dihydroxyacetone must be as nearly complete as possible. Such essentially complete conversion is necessary for a good yield of high purity dihydroxyacetone, since dihydroxyacetone in the presence of substantial amounts of glycerol, is crystallizable only with the greatest difficulty, and a product of poor quality is obtained with very low yield. Also, this microbial conversion of dihydroxyacetone to glycerol should occur in a relatively short period of time, in order that the equipment and manpower costs for a given quantity of dihydroxyacetone be kept to a minimum.

The processes described in the scientific literature for the microbial conversion of glycerol to dihydroxyacetone relate primarily to fermentation media which contain glycerol in concentrations ranging from 2% to 8%, on a weight basis. Since it has been a commonly accepted fact that increasing concentrations of glycerol resulted in decreasing percentage conversion to dihydroxyacetone, most of the published literature concerned with this fermentation reports the use of media which contain only 2% glycerol. In this connection, reports in the literature, as recent as 1947, contain the statement that in the microbial fermentation of glycerol to dihydroxyacetone, the concentration of glycerol should not exceed 6%.

The literature which reports a lowering of dihydroxyacetone yield with increasing glycerol content of the fermentation medium also reports that a marked extension in fermentation time was consistently found to be necessary to effectively oxidize high concentrations of glycerol, i.e., at least 12 days was required to obtain dihydroxyacetone in fair yield from a medium which contained 25% glycerol. Other publications report that media which contained 4½–5½% glycerol, when inoculated with Acetobacter suboxydans required 14 days to obtain yields approximating an 88%–92% conversion of glycerol to dihydroxyacetone.

It is the principal object of this invention to provide a method for the microbial conversion of glycerol to dihydroxyacetone, wherein a substantially completely quantitative conversion is achieved in a relatively short period of time, employing a fermentation medium which contains a higher percentage of glycerol than has heretofore been thought to be practicable.

Other objects will become apparent from the detailed discussion which follows.

In the practice of this invention, a member of the genus Acetobacter suboxydans is utilized for the conversion of glycerol to dihydroxyacetone, employing a medium which contains certain inorganic constituents and in excess of about 6% by weight of glycerol. Additionally, the preparation of the fermentation inoculum is conducted within a restricted pH range.

The conversion of glycerol to dihydroxyacetone is an oxidative reaction. It is well known that the rate of oxidation by microorganisms is directly related to the number of viable microorganisms present in the fermentation medium, i.e., the higher the number of microorganisms, the greater the rate of oxidation. It is also well known that the optium pH for the growth of Acetobacter suboxydans is pH 6.5, and it would be expected that the greatest degree of oxidative conversion of glycerol to dihydroxyacetone would occur at this pH. Surprisingly, in accordance with this invention, much greater yields of dihydroxyacetone are obtainable when the fermentation inoculum is grown at pH levels substantially lower than pH 6.5 than are obtainable when this inoculum is grown at the higher pH, even though the growth of the microorganism is much more rapid and extensive at the high pH in both the inoculation and the fermentation media.

Also, in accordance with this invetnion, it has been discovered that certain inorganic constituents are required for the rapid and substantially complete oxidation of glycerol to dihydroxyacetone by Acetobacter suboxydans when the concentration of glycerol in the fermentation medium is increased to more than 6% by weight. These inorganic constituents are present in and are provided by corn steep liquor. Either the commercially available corn steep liquor or the inorganic material obtained by ashing this corn steep liquor provides the beneficial results. Preferably, the corn steep liquor (or the ash therefrom, on an equivalent basis) comprises from 0.1% to 5.0% by weight of the fermentation medium.

In conformity with the prior art observations, in the evolution of the present invention it was observed that at pH 6.5, in media which contained 2% of glycerol, the glycerol could be rapidly and completely oxidized to dihydroxyacetone by Acetobacter suboxydans. However, in otherwise comparable fermentations, an increase in the glycerol concentration to 6% and 11% resulted in conversions of glycerol to dihydroxyacetone of only 60% and 44%, respectively. In accordance with this invention, when the preparation of the inoculation media is conducted at a pH of from 5.0 to 5.9, and when corn steep liquor or the ash therefrom is added to the fermentation media, conversions in excess of 85% for both the 6% glycerol and the 11% glycerol fermentations could be realized. It is the realization of these high levels of conversion that renders feasible the utilization of microbial fermentation techniques for the commercial production of dihydroxyacetone.

In the absence of proper pH control of the inoculum the presence of corn steep liquor in the fermentation media does not in and of itself provide the remarkably high conversions of glycerol to dihydroxyacetone that are obtainable in the practice of the present invention. That is, fermentation media which contains corn steep liquor and 11% glycerol, when inoculated with an *Acetobacter suboxydans* inoculum which was prepared at a pH of 6.1, provides conditions such that only 55% of the glycerol is converted to dihydroxyacetone after the fermentation has proceeded for 71 hours. On the other hand, the same fermentation medium, when inoculated with an *Acetobacter suboxydans* inoculum which was prepared at a pH of 5.5, provided conditions such that 96% of the glycerol was converted to dihydroxyacetone in 30 hours.

In the practice of the present invention, the inoculum for the fermentation media is prepared by growing the Acetobacter at a pH of from about 5.0 to about 5.9. Particularly excellent results are obtained when the pH range for the preparation of the inoculum is from 5.4 to 5.7. Normally, the pH of the fermentation medium is also within the range of 5.0 to 5.9.

Utilizing the techniques of this invention, it is possible to obtain uniformly a high percentage conversion of glycerol to dihydroxyacetone, in fermentation media which contain in excess of about 6% by weight of glycerol. Particularly advantageous results are obtained when the glycerol comprises from 6% to 15% by weight of the fermentation media.

The following detailed examples are merely illustrative of the methods of the present invention and are not to be construed as limitations on the scope of the invention. The quantity of the ingredients present in the media is expressed in terms of percent by weight.

Example 1

A fermentation inoculum was prepared by introducing *Acetobacter suboxydans* into 10 liters of an aqueous medium of the following composition: 0.5% $KH_2PO_4$, 0.5% brewer's yeast, 2.0% $CaCO_3$, 0.5% corn steep liquor and 6.0% glycerol. The medium was adjusted to pH 5.5 initially and was aerated throughout the growth period. The $CaCO_3$ serves as a buffer and prevents substantial change in the pH. After incubation of the inoculum at 30° C. for 24 hours, the resultant growth was used to inoculate 500 gallons of a fermentation medium which in composition was identical to the inoculation medium except that it contained 11.0% glycerol. The fermentation was conducted for 20 hours at 30° C. with aeration, after which time the fermentation broth was found to contain 10.4% of dihydroxyacetone. This represents a 95% conversion of glycerol to dihydroxyacetone in 20 hours.

Example 2

A fermentation inoculum was prepared by introducing *Acetobacter suboxydans* into 10 leters of an aqeous medium of the following composition: 0.5% $KH_2PO_4$, 0.5% brewer's yeast, 2.0% $CaCO_3$, 6.0% glycerol and the ash derived from an amount of corn steep liquor equivalent to 0.5%. The medium was adjusted to a pH of 5.5 and was aerated throughout the growth period. After incubation of the inoculum at 30° C. for 24 hours, the resultant growth was used to inoculate 500 gallons of a fermentation medium which in composition was identical to the inoculation medium except that it contained 10.0% glycerol. After the fermentation had proceeded for 25 hours at 30° C. with aeration, analysis showed that 97% of the glycerol had been converted to dihydroxyacetone.

Example 3

A fermentation inoculum was prepared by introducing *Acetobacter suboxydans* into 10 liters of an aqueous medium of the following composition: 0.5% $KH_2PO_4$, 0.5% brewer's yeast, 2.0% $CaCO_3$, 0.5% corn steep liquor and 6.0% glycerol. The medium was adjusted to pH 5.8 initially and was aerated throughout the growth period. After incubation of the inoculum at 30° C. for 24 hours, the resultant growth was used to inoculate 500 gallons of a fermentation medium which in composition was identical to the inoculation medium except that it contained 13.5% glycerol. After the fermentation had proceeded for 25 hour at 30° C. with aeration, analysis disclosed that 90% of the glycerol had been converted to dihydroxyacetone.

While in the foregoing specification, a detailed description of embodiments of the invention has been set forth for the purpose of understanding, it will be apparent to those skilled in the art that many modifications in the details thereof may be made without departing from the spirit and principles of the invention.

What is claimed is:

1. A method for the production of dihydroxyacetone by microbial fermentation which comprises preparing an inoculum by growing *Acetobacter suboxydans* in a growth medium which contains glycerol and which has a pH of from 5.0 to 5.9, introducing the inoculum into a fermentation medium which contains corn steep liquor and more than 6% by weight of glycerol, and permitting the fermentation to proceed until there has been substantial conversion of the glycerol to dihydroxyacetone.

2. The method of claim 1 in which the growth medium has a pH of from 5.4 to 5.7.

3. A method for the production of dihydroxyacetone by microbial fermentation which comprises preparing an inoculum by growing *Acetobacter suboxydans* in a growth medium which contains glycerol and which has a pH of from 5.0 to 5.9, introducing the inoculum into a fermentation medium which contains the inorganic material which is present in corn steep liquor and more than 6% by weight of glycerol, and permitting the fermentation to proceed until there has been a substantial conversion of the glycerol to dihydroxyacetone.

4. The method of claim 3 in which the growth medium has a pH of from 5.4 to 5.7.

5. The method of claim 1 in which the fermentation medium has a pH of from 5.0 to 5.9.

6. The method of claim 2 in which the fermentation medium has a pH of from 5.0 to 5.9.

7. The method of claim 2 in which the fermentation medium has a pH of from 5.4 to 5.7.

8. The method of claim 1 in which the glycerol in the fermentation medium is present in concentrations of from 6% to 15%.

9. The method of claim 2 in which the glycerol in the fermentation medium is present in concentrations of from 6% to 15%.

10. The method of claim 1 in which the corn steep liquor is present in concentrations of from 0.1 to 5.0%, the glycerol in the fermentation medium is present in concentrations of from 6% to 15%, and the fermentation medium has a pH of from 5.0 to 5.9.

11. The method of claim 2 in which the corn steep liquor is present in concentrations of from 0.1 to 5.0%, the glycerol in the fermentation medium is present in concentrations of from 6% to 15%, and the fermentation medium has a pH of from 5.4 to 5.7.

References Cited in the file of this patent

Prescott et al.; "Industrial Microbiology," 2nd edition, published by McGraw-Hill Book Company, New York, 1949, pp. 394, 395.